Feb. 19, 1924.
J. WALTERS
1,484,593
DEMOUNTABLE RIM PULLEY
Filed Aug. 10, 1922
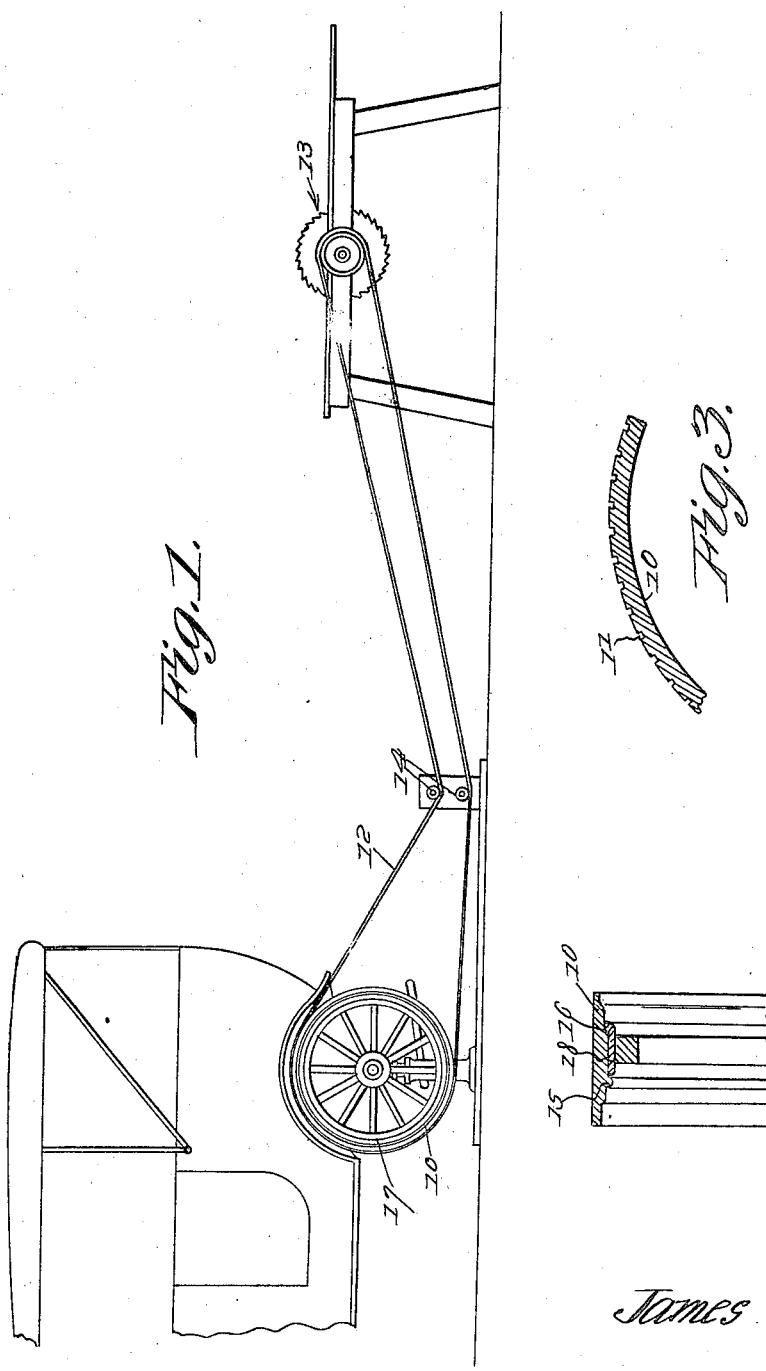
Inventor
James Walters,
By
Attorney Patented Feb. 19, 1924.

1,484,593

UNITED STATES PATENT OFFICE.

JAMES WALTERS, OF BIRMINGHAM, ALABAMA.

DEMOUNTABLE RIM PULLEY.

Application filed August 10, 1922. Serial No. 580,380.

*To all whom it may concern:*

Be it known that I, JAMES WALTERS, a citizen of the United States of America, residing at Birmingham, in the county of Jefferson and State of Alabama, have invented new and useful Improvements in Demountable Rim Pulleys, of which the following is a specification.

The object of the invention is to provide a simple and efficient means whereby a rim pulley may be employed to the driving wheel of a motor-driven vehicle for use in actuating a belt for driving machinery such as saw mills, feed cutters and the like; and with this object in view the invention consists in a construction and combination of parts of which a preferred embodiment is shown in the accompanying drawings, wherein:—

Figure 1 is a side view of a demountable rim pulley arranged in the operative position on the drive wheel of a vehicle and traversed by a driving belt for actuating a circular saw mechanism.

Figure 2 is an enlarged detail transverse sectional view of the rim pulley applied to a wheel.

Figure 3 is a similar view of a portion of the pulley detached from the wheel.

The pulley consists of a ring 10 having an outer peripheral surface which is preferably grooved transversely as indicated at 11 to provide an effective frictional engagement with a driving belt 12 adapted for actuating suitable machinery such as the circular saw mechanism indicated at 13, said belt between the drive pulley and the machine being arranged to traverse suitable guide or direction pulleys 14 which may be adapted by any suitable means to maintain a proper tension of the belt.

Interiorly the ring forming the rim is provided with parallel major and minor ribs 15 and 16 formed by thickening the ring between its side edges and thereby serving to reinforce or strengthen the rim, the major rib projecting inwardly to a greater extent than the minor rib so that when the rim is fitted on the rim 17 of a driving wheel such as those employed on motor cars and the like by sliding the same into the position indicated in Figure 2, the minor rib abuts the inner flange of the tire rim and the major rib comes in contact with the outer edge of the tire rim and the portion of the inner surface of the ring between the ribs constitutes a seat 18 bearing on the central portion of the wheel rim to hold the ring in position against displacement while in operation to drive the belt. Obviously in the use of the invention the demountable rim and its attached tire are removed and replaced with the ring provided with the peripheral pulley surface.

Having described the invention, what is claimed as new and useful is:—

1. The combination with a tire supporting rim of a wheel, said rim having opposite annular shoulders, of a demountable pulley rim provided with an outer broad periphery provided with transverse grooves to effect frictional engagement with a driving belt, said pulley rim consisting of a continuous band provided with parallel annular interior major and minor ribs, said pulley rim being centrally thickened between the ribs constituting a wheel rim engaging seat bound by said interior annular parallel major and minor ribs which are offset substantially inwardly from the opposite edges of the pulley rim, the major rib extending radially inwardly, the minor rib offset outwardly, both ribs adapted to abut said annular shoulders of the tire supporting rim, thereby acting to limit the telescopical insertion of the pulley rim on the tire supporting rim.

2. As an article of manufacture, a demountable rim pulley embodying a continuous rim having a relatively broad outer periphery provided with transverse grooves to effect frictional engagement with a driving belt, the inner surface of said rim being provided with parallel annular major and minor ribs offset substantially inwardly from opposite edges of the rim pulley and adapted for engagement with annular shoulders of a tire supporting rim of a wheel, the body of said continuous rim between said major and minor ribs being thickened, thereby providing a continuous internal annular seat intervening and being bound by the parallel ribs and adapted to telescope the outer periphery of the tire supporting rim.

In testimony whereof he affixes his signature.

JAMES WALTERS.